United States Patent [19]

Rathi et al.

[11] 4,344,497

[45] Aug. 17, 1982

[54] OVERRIDE CONTROL FOR AXLE LOCKING APPARATUS OF MOBILE CRANE

[75] Inventors: Ram N. Rathi; Ronald E. Nelson, both of Cedar Rapids, Iowa

[73] Assignee: Harnischfeger Corporation, West Milwaukee, Wis.

[21] Appl. No.: 86,661

[22] Filed: Oct. 19, 1979

[51] Int. Cl.³ .................... B60G 17/00; B66C 13/12; B66C 23/04
[52] U.S. Cl. ..................... 180/41; 180/6.58; 212/231; 212/271; 212/159; 212/162; 251/14; 280/6 R; 280/6 H; 280/6.11
[58] Field of Search ............. 280/6 R, 6 H, 6.11; 180/41, 6.58; 414/699, 701; 251/14; 212/211, 223, 227, 159, 229, 162, 244, 231

[56] References Cited

U.S. PATENT DOCUMENTS

| | | | |
|---|---|---|---|
| 2,496,040 | 1/1950 | Criley | 251/14 |
| 2,682,282 | 6/1954 | Tievaskis | 251/14 |
| 2,809,799 | 10/1957 | Cunningham | 251/14 |
| 3,007,487 | 11/1961 | Adams | 251/14 |
| 3,253,669 | 5/1966 | Schoetz | 180/6.58 |
| 4,206,900 | 6/1980 | Willis | 251/14 |

OTHER PUBLICATIONS

Shop Manual–Ω14–15–18–20, Harnischfeger, P and H Bulletin Omega 14, 15, 18 and 20-3-SM.

Primary Examiner—John J. Love
Assistant Examiner—R. B. Johnson
Attorney, Agent, or Firm—James E. Nilles

[57] ABSTRACT

A pair of hydraulic locking cylinders for a vertically oscillatable wheel axle on the carrier frame of a mobile crane are interconnected and controlled by a hydraulic double-locking valve which is responsive to the centered or off-centered rotary position of the boom-carrying rotatable upper section of the crane. The double-locking valve comprises a pair of normally closed ball-type check valves which are operated by a valve stem comprising independently movable upper and lower sections. The upper valve stem section is positioned by a cam on the crane upper section and the lower valve stem section is positioned by a pneumatic actuator which is controlled by a solenoid valve selectively actuatable by an electric override switch in the crane operator's cab. The upper valve stem is moved to down (valve open-axle unlocked) position by the cam when the crane upper is centered on the carrier frame. The upper valve stem moves to up (valve closed-axle locked) position when the crane upper is rotated off-center. The lower valve stem is selectively movable to up (valve open-axle unlocked) position from its lower (valve closed-axle locked) position by the pneumatic actuator to unlock the axle and allow the crane to be repositioned by the crane operator even while the crane upper section and its boom are off-center.

5 Claims, 6 Drawing Figures

U.S. Patent  Aug. 17, 1982  Sheet 1 of 3  4,344,497

OVERRIDE CONTROL FOR AXLE LOCKING APPARATUS OF MOBILE CRANE

BACKGROUND OF THE INVENTION

1. Field of Use

This invention relates generally to apparatus for locking and unlocking the freely oscillatable rear axles of rough terrain mobile cranes and, in particular, to selectively operable override control means in such apparatus to effect axle unlocking.

2. Description of the Prior Art

Some rough terrain mobile hydraulic cranes comprise a mobile lower section, including a chassis or carrier frame having rubber-tired ground-engaging wheels mounted on vertically oscillatable axles. A rotatable upper section, including a boom, is mounted on the carrier. The oscillatable axles, usually the rear axles, are free to move up and down with the contour of uneven ground as the crane is driven thereacross and such oscillation keeps the wheels in contact with the ground on uneven terrain to better support the crane when it is to be operated. Each such axle pivots about a central point and, for example, the right rear wheel may be high while passing over a bump, in which event the left rear wheel will be low relative to the carrier frame. When the crane is "working on rubber", i.e., without its outriggers extended, it is possible for tipping of the crane to occur as a load is swung or lifted over the side of the crane by the boom on the rotated upper section.

Two hydraulic cylinders mounted between the ends of the axle and each side of the frame to permit axle oscillation must be locked while lifting loads in other than the front area of the machine in order to prevent tilting of the carrier frame. Accordingly, locking means are provided for locking the cylinders for the oscillatable axles in down position when lifting over the side of the crane is to be carried out. One type of prior art locking means comprises a manually movable member which is placed in an interfering relationship with relatively movable components of an oscillating axle when locking is required. Another type of prior art locking means comprises hydraulically powered and controlled locking cylinders or rams which are actuatable to effect axle locking and unlocking automatically in response to the rotary position of the crane upper section relative to the carrier frame. In one embodiment of the latter prior art means a locking cylinder having its housing connected to the frame has a piston rod which is connected to and oscillates with the oscillatable axle as the wheel moves over uneven ground. Two such locking cylinders on opposite sides of the crane are interconnected through and controlled by a hydraulic locking valve.

Generally speaking, locking is accomplished automatically by actuating an electric cam controlled switch while the crane is in the travelling mode (boom over front), which switch in turn may activate a hydraulic solenoid valve. The solenoid valve directs the pilot pressure to open the hydraulic locking valve in the cylinder circuit to let hydraulic oil move freely between the two cylinders and sump.

The above function can also be accomplished more simply by mechanically actuating a spool operated lock valve by the rotating motion of the crane upper structure. The lock valve is kept in release position while the machine is in travelling position and automatically locked when the upper is rotated. Such a lock valve has a movable spool which is actuated by a cam on the crane upper to either unlocked or locked position. When the crane upper section is centered with the boom over front on the carrier frame, the valve is unlocked by the cam position and oil is able to flow freely between the two lockout cylinders which are then able to oscillate with the axles in response to ground contours. When the crane upper section is off-center, as when handling a side load, the valve is locked as a result of cam position and the locking cylinders then lock in the last position they were in so as to hold the rear end of the carrier frame in horizontal position. In one such prior art arrangement, the locking valve includes a pair of ball-type check valves operated by a vertically shiftable two-position valve stem which, when depressed by the cam, allows the check valves to open and unlock the cylinder, and when released by the cam, causes the check valves to close to prevent free oil flow and lock the cylinders. However, sometimes it is desirable to be able to unlock the oscillatable axles, even while the upper section is off-center, so that the carrier can be repositioned and override means are provided in some prior art axle locking systems. For example, for pick and carry operation or moving the machine around, often the boom is not in the front position. Therefore, in automatically actuated systems, the cylinders stay in locked position preventing free oscillation or repositioning of the axle. Under these conditions an override control is necessary so that the operator can make on the spot adjustment to position the axle correctly.

Override control can be accomplished in the aforementioned system having an electric cam controlled switch wherein when electric signal from the cam switch is available. However, the system becomes complicated since it must use some form of hydraulic pilot interface to actuate the cylinder locking valves. The mechanical system described above is simple, but is not well suited for inclusion of override control means.

SUMMARY OF THE INVENTION

In accordance with the present invention there is provided improved override control means for unlocking hydraulically operated locking cylinders for oscillatable axles in a mobile crane, which cylinders are controlled by a cam-operated hydraulic locking valve which is responsive to the rotary position of the upper section of the crane. The present invention utilizes the simplicity of a mechanical actuating system for locking and unlocking the axles and provides an override control means therefor which is relatively uncomplicated.

In accordance with the invention a pair of hydraulic locking cylinders for a vertically oscillatable wheel axle on the carrier frame of a mobile crane are interconnected and controlled by a hydraulic double-locking valve which is responsive to the centered or off-centered rotary position of the boom-carrying rotatable upper section of the crane. The double-locking valve comprises a pair of normally closed ball-type check valves which are operated by a valve stem comprising independently movable upper and lower sections. The upper valve stem section is positioned by a cam on the crane upper section and the lower valve stem section is positioned by a pneumatic actuator which is controlled by a solenoid valve selectively actuatable by an electric override switch in the crane operator's cab. The upper valve stem is moved to down (valve open-axle unlocked) position by the cam when the crane upper is centered on the carrier frame. The upper valve stem moves to up (valve closed-axle locked) position when the crane upper is rotated off-center. The lower valve stem is selectively movable to up (valve open-axle unlocked) position from its lower (valve closed-axle locked) position by the pneumatic actuator to unlock the axle and allow the crane lower carrier to be repositioned by the crane operator even while the crane upper section and its boom are off-center.

The override control means hereafter described utilizes an air cylinder as an actuating means. The double-locking valve is released when a roller mounted on the upper stem is pushed down by means of a mechanical cam plate mounted on the rotating structure of the crane when the boom is in the front of the machine, i.e., in travelling position.

The similar lower stem on the opposite side of the valve is provided for override control. The air cylinder connected to this lower stem pushes the stem upwards when air is directed on the piston side of the air cylinder, thus releasing the check valves.

The air flow to the air cylinder is controlled by a solenoid valve which is electrically actuated by the operator when the override switch button is pushed in the operator's compartment.

Some advantages of the override control means in accordance with the invention are that it is well-suited for use on typical hydraulic cranes on which pressurized oil and air and electric power are readily available. Furthermore, it employs and combines the advantageous features of several different types of hereinbefore described prior art systems. The double-lock valve provided is an adaptation or modified form of existing type of hydraulic valve presently used in axle locking systems and, therefore can be readily and economically fabricated. Other objects and advantages will hereinafter appear.

DESCRIPTION OF A PREFERRED EMBODIMENT

Figure 1:
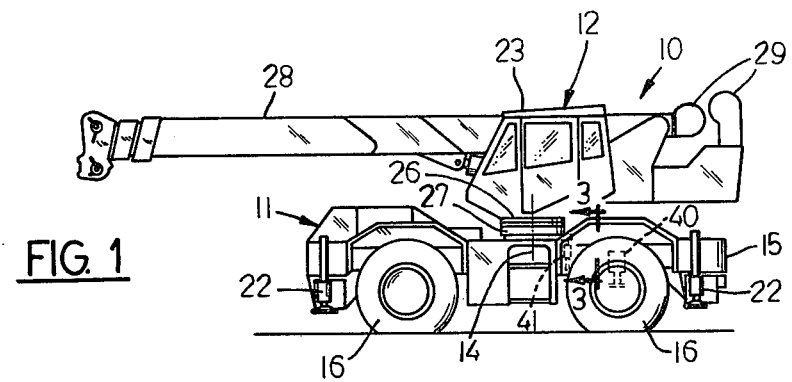
FIG. 1 is a side elevational view of a mobile crane in which apparatus in accordance with the present invention is embodied.
Figure 2:
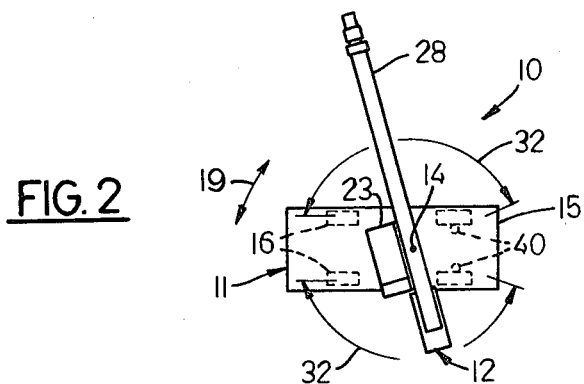
FIG. 2 is a schematic top view of the crane shown in FIG. 1.

FIGS. 1 and 2 show a rough terrain mobile crane 10 of a type with which override control means for axle locking apparatus in accordance with the present invention is advantageously employed. Crane 10 generally comprises a mobile lower section 11 and an upper section 12 which is mounted thereon for rotation or swinging, as indicated by arrow 19, in either direction about a vertical axis 14.

Figure 5:
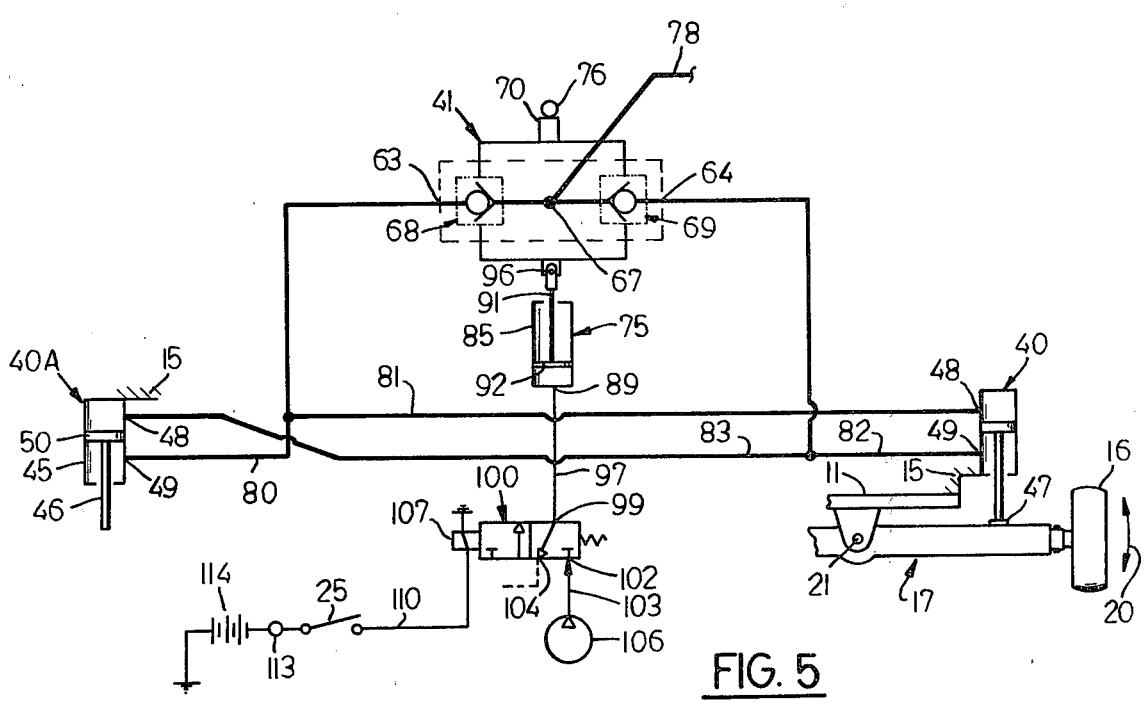
FIG. 5 is a schematic diagram of the hydraulic, pneumatic and electrical circuits of the apparatus shown in FIGS. 3 and 4.

Mobile lower section 11 of crane 10 comprises a chassis or carrier frame 15 which is provided with a plurality of ground-engaging wheels 16, at least some of which are steerable. As FIG. 5 shows, the pair of rear wheels 16 are mounted on an oscillatable axle assembly 17 which is, in turn, connected by a pivot pin 18 to carrier frame 15. These wheels 16 and their oscillatable axle assembly 17 are pivotable in the direction of an arrow 20 about a horizontal pivot axis 21. Mobile lower section 11 also comprises a plurality of horizontally extendable/retractable vertically adjustable outriggers 22 which are shown retracted in FIGS. 1 and 2 but which are understood to be deployable when crane 10 is to be used for load lifting.

A driver's and operator's cab 23 is mounted on upper section 12 of crane 10 and is understood to contain various control devices for driving and operating the mobile crane, including, as FIG. 5 shows, an electric switch 25, hereinafter described, for the override means of the axle lockout apparatus in accordance with the invention.

Upper section 12 of crane 10 comprises a platform 26 which is rigidly connected to a rotatable circular slewing ring assembly 27 therebeneath and the platform supports a vertically pivotable, extendable/retractable multisection hydraulically operated telescopic boom 28, as well as winches 29 and other components necessary for operation and use of the boom. It is to be understood that when upper section 12 is rotated or swung from its dead-centered road-transport position shown in FIG. 1 wherein the boom 28 extends over the front of the carrier frame 15 into a position wherein the boom 28 lies or extends within a position range designated 32, as in FIG. 2, there is a risk of the crane 10 tipping over, if the boom 28 is telescopically extended too far in view of the weight of the load being lifted thereby while the outriggers 22 are not deployed and if the oscillatable axles 17 are not locked against vertical pivotable movement relative to carrier frame 15 about the pivot axes 21.

Figure 4:
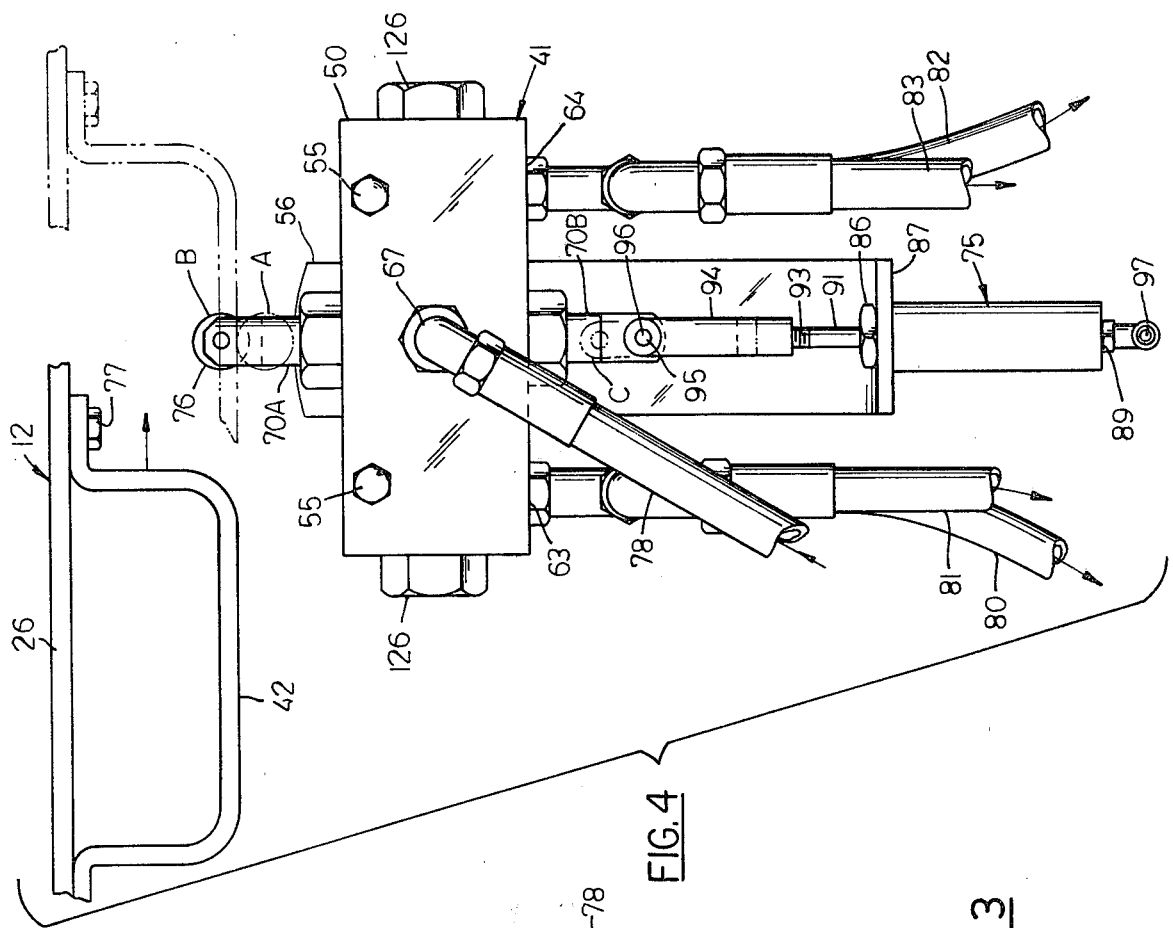
FIG. 4 is an end elevational view, partly in cross-section, of the apparatus of FIG. 3.
Figure 3:
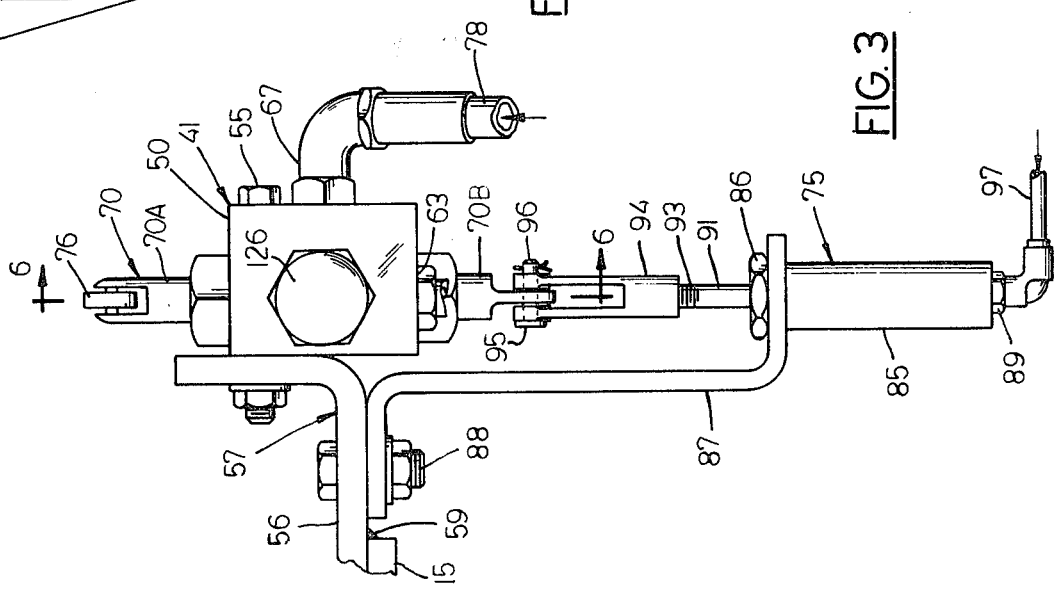
FIG. 3 is an enlarged, side elevational view of override control means for axle locking apparatus in accordance with the invention taken on line 3—3 of FIG. 1.

As FIGS. 3, 4 and 5 show, means are provided to lock the pair of rear wheels 16 and their associated oscillatable axle assembly 17 against rotation about horizontal pivot axis 21 whenever upper section 12 of crane 10 is rotated off dead-center to such a position that boom 28 reaches or comes within position range 32 and to effect unlocking when the upper section is rotated so that the boom leaves position range 32 and is returned to dead-center position. As FIG. 5 shows, such means generally comprise a pair of lockout cylinders or rams 40, 40A for the oscillatable axle assembly 17, a lock valve 41 for controlling operation of the lockout cylinders 40, 40A, and cam means in the form of a cam bracket 42 for operating valve 41.

Each of the two lockout cylinders 40, 40A shown in FIG. 5 is a double-acting cylinder and comprises a cylinder housing 45 which is rigidly secured to carrier frame 15 and further comprises an extendable/retractable piston rod 46 which is pivotably connected by a means 47 to an associated end of oscillatable axle assembly 17. Cylinder housing 45 is provided with hydraulic fluid ports 48 and 49 which are located on opposite sides of a piston 50 connected to piston rod 46.

Figure 6:
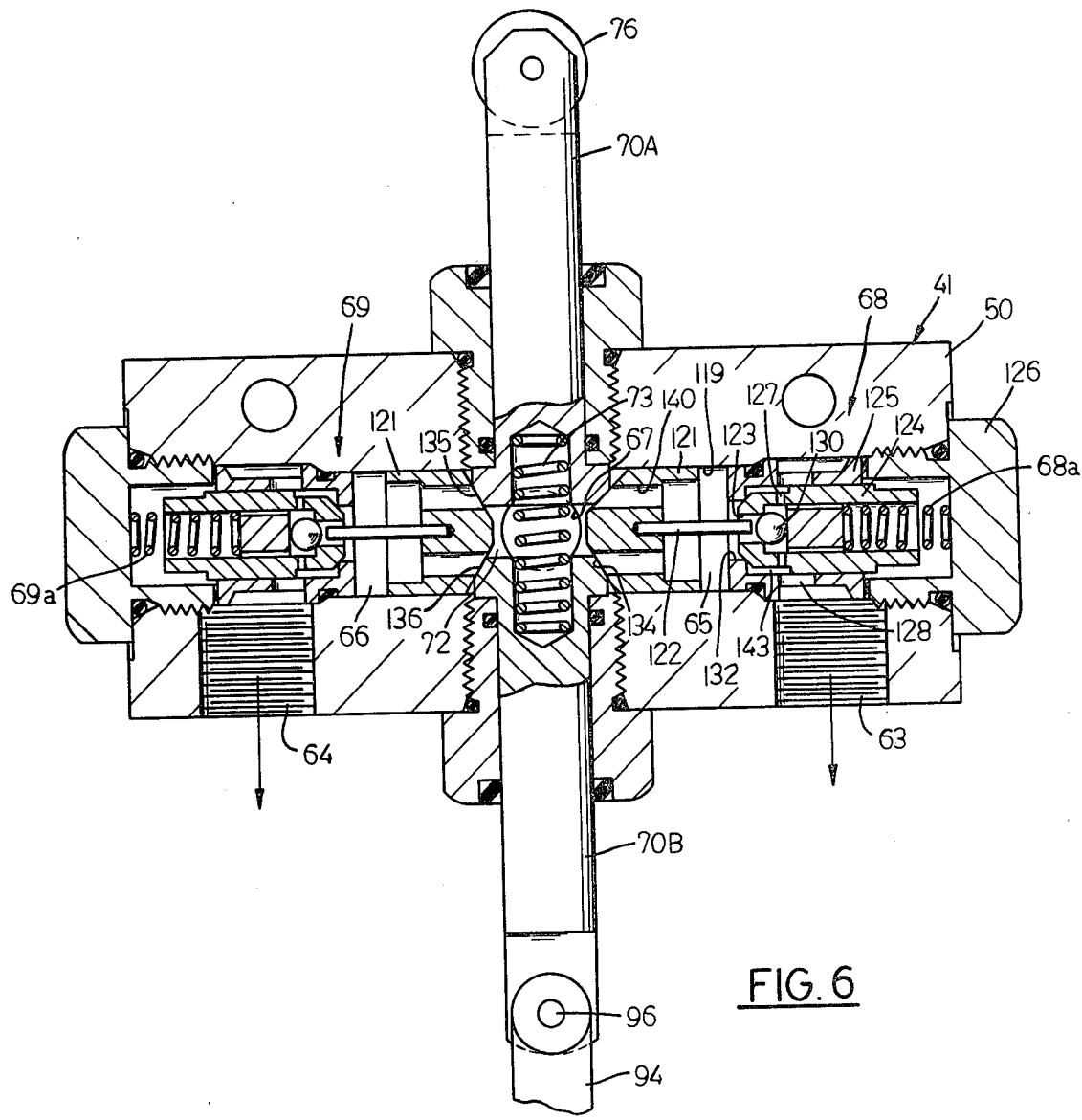
FIG. 6 is an enlarged cross-sectional view of the double-locking valve taken on line 6—6 of FIG. 3.

As FIGS. 3 through 6 show, lock valve 41 comprises a housing 50 which is rigidly secured as by bolts 55 to the upper arm 56 of a bracket assembly 57 which, in turn, is rigidly secured as by welding at 59 to a portion of carrier frame 15. Housing 50 is provided with hydraulic fluid ports 63 and 64 which are connected by internal fluid passages 65 and 66, respectively, and through to a passage 72 to a hydraulic fluid inlet port 67. A pair of ball-type check valves 68 and 69, poled as shown, are located in the passages 65, 66, respectively, and are normally spring biased to closed (seated) position, as shown in FIGS. 5 and 6, by biasing springs 68a and 69a, respectively. The check valves 68 and 69 are movable to open and closed position by means of independently vertically movable upper and lower valve stems 70A and 70B, repectively, which slideably disposed in a vertical bore or passage 72 in valve housing 50 and cooperate with the check valves 68 and 69.

The upper and lower valve stems 70A and 70B project from the opposite (upper and lower) sides of valve housing 50 and the upper end of upper stem 70A is provided with a cam engaging roller 76, whereas the lower end of lower stem 70B is provided with means, such as a pin hole 96, whereby it is connected to a pneumatic actuator 75, hereinafter described. As FIGS. 4 and 6 best show, each stem 70A and 70B has two positions; namely: an outward position wherein it is biased by a biasing spring 73 and an inward or depressed position.

The upper valve stem 70A is positioned by a cam 42 on crane upper section 12 and the lower valve stem 70B is positioned by pneumatic actuator 75 which is controlled by a solenoid valve 100 selectively actuatable by the electric override switch 25 in the crane operator's cab 23. The upper valve stem 70A is moved to down (valve open-axle unlocked) position by the cam 42 when the crane upper 12 is centered on the carrier frame 11. The upper valve stem 70A moves to up (valve closed-axle locked) position by biasing spring 73 when the crane upper 12 is rotated off-center. The lower valve stem 70A is selectively movable to up (valve open-axle unlocked) position from its lower (valve closed-axle locked) position wherein it is biased by spring 73 by the pneumatic actuator 75 to unlock the axle assembly 17 and allow the crane 10 to be repositioned by the crane operator even while the crane upper section 12 and its boom 28 are off-center.

As FIG. 6 shows, the check valves 68 and 69 in valve 41 are similar in construction and mode of operation and, therefore, only check valve 68 is hereinafter described in detail. Valve 68 is disposed in a bore 119 in valve housing 50 includes an actuator member 121 which is slidable in bore 119 and engageable with the stems 70A and 70B. A pin 122 connected to actuator member 121 extends through an end opening 123 in a hollow piston 124 which is slidably mounted in a sleeve 125 which is secured within bore 119 by means of a threaded end plug 126. Sleeve 125 is provided with radial passage 128. Hollow piston 124 contains a ball 130 which is normally biased by spring 68a to a seated position (as shown) against end opening 123 in piston 124. Piston 124 also includes radial passages 127 which are cut off from communication with end opening 123 when ball 130 is seated. Spring 68a, acting through ball 130, also biases hollow piston 124 to a seated position (as shown) against an end opening 132 in sleeve 125 through which pin 122 also extends. The actuator member 121 has a tapered or conical end face 134 which slidably bears against tapered end faces 135 and 136 provided on the innermost spaced apart ends of the upper and lower valve stems 70A and 70B, respectively. The actuator member 121 also has fluid passages 140 extending through the face 134 thereof. When valve stems 70A and 70B are spring-biased outwardly as shown in FIG. 6, both balls 130 are seated and there is no fluid communication from port 67 to ports 63 and 64. However, if either valve stem 70A or 70B is depressed inwardly, tapered surface 135 or 136 bears against tapered end face 134 of actuator member 121 causing it to shift to a position wherein pin 122 unseats ball 130. As this occurs fluid flows from port 72, through the passages 140, through opening 132 in sleeve 125, through opening 123 in piston 124, port ball 130, through the radial passages 127 in piston 124, and through the radial passages 128 in sleeve 125 to port 63. Fluid pressure build-up in a space 143 between portions of the face of piston 124 and the valve seat around opening 132 in sleeve 125 resulting from unseating of ball 130 causes piston 124 to shift against the force of biasing spring 68a to fully open position whereby fluid can then flow freely from opening 132 to the radial passages 128. When both valve stems 70A and 70B are returned to the underpressed positions shown in FIG. 6, ball 130 and piston 124 are both seated in closed position and valve 41 is closed.

Cam bracket 42 takes the form of a U-shaped rigid member which is rigidly secured as by bolts 77 to the underside of upper section plateform 26 in a location which is at the center rear thereof when upper section 12 is substantially at dead-center relative to lower section 11 and the crane boom 28 is located directly over the front end of the carrier 15. In centered position, cam bracket 42 engages roller 76 and depresses upper stem 70A to its lower position (see FIG. 4) wherein the check valves 68 and 69 are open and valve 41 is in unlocked condition.

As FIG. 5 shows, hydraulic fluid inlet port 67 of valve 41 is connected by a hose or fluid line 78 to a low pressure hydraulic fluid return line (not shown). Fluid port 63 of valve 41 is connected by hoses or fluid lines 80 and 81, respectively, to the port 49 of one lockout cylinder 40A and to the port 48 of the other lockout cylinder 40. Fluid port 64 of valve 41 is connected by hoses or fluid lines 82 and 83, respectively, to the port 49 of said other lockout cylinder 40 and to the port 48 of said one lockout cylinder 40A. Port 48 of said other cylinder 40 is connected by the lines 80 and 81 to port 49 of said one cylinder 40A. Port 48 of said one cylinder 40A is connected by the lines 83 and 82 to port 49 of said other cylinder 40.

As FIGS. 3, 4 and 5 show, pneumatic actuator 75 is a single-acting cylinder and comprises a cylinder housing 85 which is rigidly secured as by a nut 86 to the lower arm 87 of bracket assembly 57 which, in turn, is secured to upper arm 56 of bracket assembly 57 by a bolt 88. Housing 85 is provided with a fluid port 89 at its lower end. Actuator 75 further comprises a vertically disposed extendable/retractable piston rod 91 which has a piston 92 thereon. Piston rod 91 is externally threaded at 93 and threadably connected to a clevis 94 which is pivotally connected by a clevis pin 95 to the lower outwardly extending end of lower valve stem 70B of lock valve 41; such end being provided with pin-receiving hole 96.

As FIG. 5 shows, fluid port 89 of pneumatic actuator 75 is connected by a hose or fluid line 97 to a two-position three-way solenoid valve 100. The port 102 of valve 100 is connected by a hose or fluid line 103 to a source 106 of pressurized air. Port 104 of valve 100 exhausts to atmosphere. The solenoid coil 107 of solenoid valve 100 has one side connected to ground and its other side connected by an electrical conductor or wire 110 to one side of normally open, single pole single throw push-button type switch 25 whose other side is connected to the power supply terminal 113 of an electric power source 114, such as a battery, generator, or alternator of mobile crane 10. When switch 25 is open, solenoid coil 107 is de-energized and solenoid valve 100 assumes the exhaust position (shown in FIG. 5) and no pressurized air is supplied to pneumatic actuator 75.

The apparatus hereinbefore described operates as follows. Assume that upper section 12 of crane 10 is centered relative to the lower section 11 of crane 10 and that stem 70A of locking valve 41 is held in lower position by cam 42. Further assume that switch 25 is open and that solenoid valve 100 is in exhaust position. With these assumptions the check valves 68 and 69 of locking valve 41 are unseated by valve stem 70A and oil is allowed to flow between the two lock-out cylinders 40 and 40A. In this situation, the piston rods 46 of the lock-out cylinders will oscillate with the contour of the ground as the crane 10 is driven thereover. When the crane 10 is stopped and the boom 28 is swung a predetermined distance in either direction upper section 12 is rotated that the cam 42 moves off cam roller 76 of valve stem 70A and the latter moves to up position and the check valve balls 68 and 69 seat, thereby preventing oil flow between the lock-out cylinders 40, 40A. The lock-out cylinder piston rods 46 now lock in the last position they were in and hold the rear end of the lower section 11 of crane 10 in a horizontal position. If the operator desires to drive and reposition the crane 10 while the boom 28 and upper section 12 are in off-center position, then the override switch 25 is closed and held closed. When switch 25 is closed, solenoid coil 107 is energized and valve 100 shifts from the position shown in FIG. 5 to its other position wherein compressed air can flow from source 106 to pneumatic cylinder 75 thereby causing stem 70B of lock-out valve 41 to move upward from lower (closed-locked) position to its upper (open-unlocked) position. The stem 70B holds the check valve balls 68 and 69 open, allowing the axle 17 to oscillate even though the upper section 12 is rotated and boom 28 is swung over the side of the crane.

When switch 25 is opened, coil 107 is deenergized, valve 100 shifts back to exhaust position, and the biasing spring 72 force stem 70B back to lower (closed-locked) position.

We claim:

1. In a mobile crane comprising:
    a lower carrier frame, an upper crane section pivotally mounted on said carrier frame for rotation thereon about a vertical axis;
    an oscillatable axle assembly with ground engaging means attached thereto, means pivotally mounting said axle assembly to said carrier frame for rotation about a horizontal axis;
    locking fluid cylinder means including a cylinder housing with an extendable/retractable piston rod therein, means pivotally mounting either of said piston rod or said cylinder housing to said axle assembly and the other of said piston rod or said cylinder housing rigidly to said carrier frame;
    locking valve means mounted on said carrier frame for controlling said fluid cylinder means, conduit means connecting said locking valve means to said fluid cylinder means, said locking valve means including a housing, a plurality of check valves therein and first and second independently movable valve stem means extending from said housing and operative to open and close said check valve means;
    cam means mounted on said upper section and engageable with said first valve stem means when said upper section is rotated to a predetermined position to open said check valve means for permitting said axle assembly to pivot about said horizontal axis, power means connected to said second valve stem means, manually operated control means operatively connected to said power means to selectively actuate said second valve stem to open said check valve means when said upper section is in any of its rotatable position other than said predetermined position.

2. A combination according to claim 1 wherein said first and second valve stem means extend from opposite sides of said housing and are operatively associated with said cam means and with said power means, respectively.

3. A combination according to claim 2 wherein said locking fluid cylinder means includes a pair of locking cylinders, wherein said locking valve means includes a pair of check valves, one for each locking cylinder and wherein said valve housing includes a passage extending therethrough between said check valves and wherein said first and second valve stem means are movably mounted and arranged to operate said check valves.

4. A combination according to claim 3 wherein each check valve includes an actuating member therefor which extends into said passage and wherein each valve stem means includes a portion for operatively engaging said actuating member.

5. A combination according to claim 1 or 4 wherein said power means comprises a fluid-operated ram including a cylinder and piston having a piston rod, said piston rod being connected to said other valve stem means, a solenoid valve for controlling said fluid-operated ram, and an electric switch for controlling said solenoid valve.

* * * * *